US012291099B2

United States Patent
Inoue et al.

(10) Patent No.: US 12,291,099 B2
(45) Date of Patent: May 6, 2025

(54) END ZONE OVERHEAD DISPLAY STRUCTURE FOR VEHICLES

(71) Applicant: Honda Motor Co., Ltd., Tokyo (JP)

(72) Inventors: Kohei Inoue, Utsunomiya (JP); Patrick J. Ellison, Plain City, OH (US); Taiga Marukawa, Rochester Hills, MI (US); Kosaku Tomozawa, Utsunomiya (JP); Akira Futatsuhashi, Utsunomiya (JP); Takashi Nakano, Utsunomiya (JP); Jagpaul S. Pandher, Plain City, OH (US); Tsuyoshi Higuchi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 18/049,404

(22) Filed: Oct. 25, 2022

(65) Prior Publication Data

US 2024/0131929 A1 Apr. 25, 2024
US 2024/0227556 A9 Jul. 11, 2024

(51) Int. Cl.
*B60K 35/00* (2024.01)
*B60R 11/02* (2006.01)
*B60K 35/22* (2024.01)
*B60K 35/60* (2024.01)
*B60R 11/00* (2006.01)

(52) U.S. Cl.
CPC .......... *B60K 35/00* (2013.01); *B60R 11/0235* (2013.01); *B60K 35/22* (2024.01); *B60K 35/60* (2024.01); *B60K 2360/771* (2024.01); *B60R 2011/0028* (2013.01)

(58) Field of Classification Search
CPC .. B60K 35/00; B60K 2360/771; B60K 35/60; B60K 35/22; B60R 11/0235; B60R 2011/0028
See application file for complete search history.

(56) References Cited

U.S. PATENT DOCUMENTS

| 7,688,397 | B2 | 3/2010 | Serizawa et al. |
| 7,894,003 | B2 | 2/2011 | Chang |
| 7,903,180 | B2 | 3/2011 | Boundy et al. |
| 7,975,350 | B2 | 7/2011 | Nagami |
| 8,434,198 | B2 | 5/2013 | Nagami et al. |
| 9,701,257 | B2 | 7/2017 | Vitito |
| 11,092,452 | B2 * | 8/2021 | Jones ................ B60W 60/0015 |

(Continued)

FOREIGN PATENT DOCUMENTS

| CN | 206217779 U | 6/2017 |
| CN | 108583458 A | 9/2018 |

(Continued)

*Primary Examiner* — Zaihan Jiang
(74) *Attorney, Agent, or Firm* — Plumsea Law Group, LLC

(57) ABSTRACT

For a vehicle interior compartment defined by a vehicle floor, opposing sidewalls, a forward end and a rearward end, and a vehicle ceiling covering at least part of the compartment, an end zone overhead display structure includes bulkhead forming attachment elements coupled to a roof strut spanning from sidewall to sidewall of the vehicle roof. The display structure includes an open box-like upper bracket and an open box-like lower bracket coupled together with the roof strut interposed to provide an assembly that reduces unwanted motion, rotation or vibration of the display assembly.

20 Claims, 10 Drawing Sheets

(56) References Cited

U.S. PATENT DOCUMENTS

| | | | |
|---|---|---|---|
| 2004/0095255 A1* | 5/2004 | Namaky | G07C 5/004 340/425.5 |
| 2007/0040403 A1 | 2/2007 | Yang | |
| 2008/0222005 A1* | 9/2008 | Schickler | G06Q 30/06 705/26.61 |
| 2009/0032665 A1 | 2/2009 | Smith, Jr. et al. | |
| 2011/0082714 A1* | 4/2011 | Gaikwad | G06Q 10/02 705/5 |
| 2011/0153116 A1* | 6/2011 | Bedingfield, Sr. | G08G 1/096725 701/1 |
| 2016/0090041 A1* | 3/2016 | Nagasawa | G06T 3/00 345/7 |
| 2019/0001891 A1 | 1/2019 | Suzuki et al. | |
| 2023/0406225 A1* | 12/2023 | Inoue | B60R 11/0235 |

FOREIGN PATENT DOCUMENTS

| | | | |
|---|---|---|---|
| GB | 2511568 | * | 8/2023 |
| JP | 2012228969 A | | 11/2012 |
| JP | 2017114287 A | | 6/2017 |
| KR | 200220499 Y1 | | 4/2001 |
| KR | 200399670 Y1 | | 10/2005 |

* cited by examiner

END ZONE OVERHEAD DISPLAY STRUCTURE FOR VEHICLES

BACKGROUND

The present disclosure generally relates to an end zone display structure for vehicles, and more particularly, to an overhead structure for vehicles.

Display systems are commonly provided in vehicles today, such as in airplanes, buses, passenger vehicles and minivans. For example, automotive vehicles may be equipped with various electronic entertainment and information systems, sometimes referred to as infotainment systems. Such displays can offer information and entertainment for passengers, including but not limited to mapping and navigation tools, web browsing, video streaming or playback, and video game systems. The displays are typically mounted on a front dashboard of the vehicle or on a rear portion of a seat such as in the back of a front seat headrest or seat back. Such display arrangements are used in conventional vehicles where the vehicle operator and/or passengers are seated in a forward-facing direction.

There is a need in the art for a display system that accommodates non-traditional vehicle seating layouts, in particularly with respect to autonomous vehicles.

SUMMARY

The disclosed embodiments provide methods and systems for an overhead display system in vehicles.

A vehicle interior is defined by an interior compartment defined by a vehicle floor, opposing sidewalls, a forward end and a rearward end, and a vehicle ceiling covering at least part of the compartment. The vehicle interior has a central zone and a front end zone and an rear end zone for mounting displays. In this application, an end zone overhead display system for a vehicle is described having a front display assembly including a front upper bracket and a front lower bracket attached to a front roof strut interposed therebetween. The front lower bracket includes an attachment flange attached to an attachment fin of a front display housing. In addition, the system includes a rear display assembly having a rear upper bracket, a rear lower bracket extension attached to a rear roof strut interposed therebetween. The rear display assembly also includes a rear lower bracket attached to the rear lower bracket extension and including an attachment flange attached to an attachment fin of a rear display housing.

In another aspect of the disclosure, an overhead display system for a vehicle comprises a roof strut having an upwardly facing channel extending across the vehicle ceiling from sidewall to sidewall, with the channel defined by a front wall and a rear wall and presenting a bulkhead. A display mounting assembly is connected to the roof strut at a desired location for a display. The mounting assembly incudes an upper bracket having a front wall and a rear wall configured such that the upper bracket fits into a channel in the roof strut with the bracket front wall abutting against the channel front wall, and the bracket rear wall abutting against the channel rear wall.

The system also includes a lower bracket having a pair of side walls each with an integral downward extending attachment flange. The lower bracket is attached to the underside of said roof strut channel in alignment with said upper bracket. At least one fastener is used to attach the upper bracket and the lower bracket together such that said roof strut is sandwiched therebetween. A display unit disposed in a display housing is attached to at least one of the attachment flanges to mount the display unit in a desired overhead position and viewing angle within the interior compartment.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
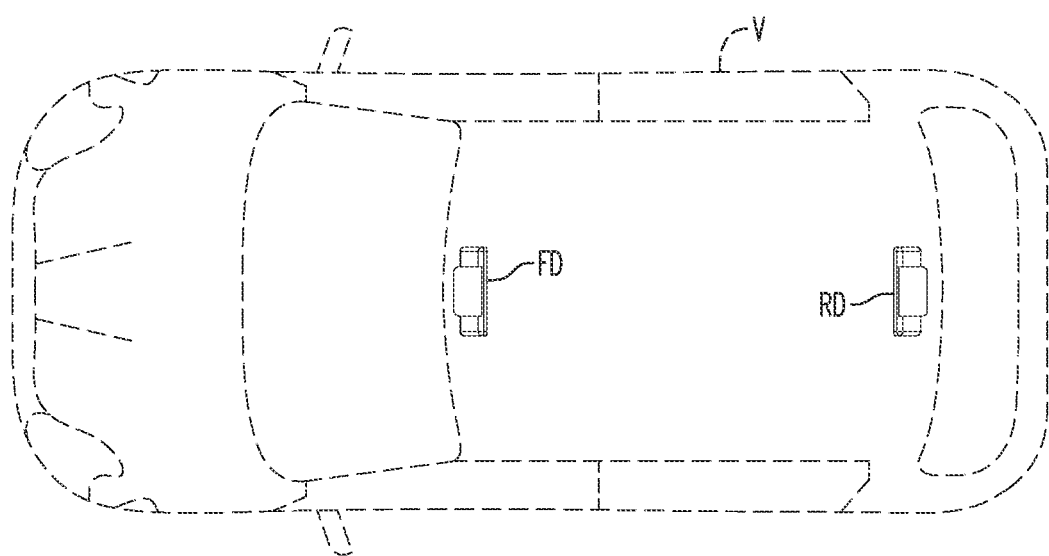
FIG. 1 presents an overhead schematic view of a vehicle roof showing placement of overhead end zone displays on the interior ceiling of the vehicle, according to an embodiment.

Modern vehicles are increasingly equipped with display apparatuses. Such displays can provide the passengers with information, such as information about a path to a destination from an origin, and information about the current location of the vehicle. In some cases, the display may playback music or video, provide information about the state of the vehicle, or information for user convenience, such as weather and news. In general, conventional vehicle display systems are designed with the standard seating arrangements found in such vehicles. More specifically, vehicles primarily offer forward-facing seats. Thus, the display systems are constructed based on the premise that passengers will be sitting in an upright position and facing forward.

However, vehicles are increasingly developing modifications in passenger seating arrangements. Autonomous driving aims to reduce or eliminate a human driver's role in driving a vehicle to drastically reduce accidents. Some vehicles, such as those featuring Society of Automotive Engineers (SAE) Level 3+ automated driving capability, will be able to take control of driving, allowing drivers to spend their time in other activities, such as talking to other occupants, listening to song, podcasts or watching videos. When not driving, the drivers may relax by reclining their seats or talking to fellow passengers by swiveling their seat. In fully autonomous (SAE Level 5) vehicles, self-driving system will take full control of driving. With a higher level of automation there is a greater likelihood of unusual interior concept and seat configuration.

Driverless or autonomous vehicles (AVs) may be configured with a passenger compartment including one or more seats that are oriented in various directions. In some cases, the seats can be moved or swiveled from a front-facing position to a rear-facing position for when the vehicle is operating in an autonomous mode. In some other cases, the AV may include a passenger compartment in which the seats are arranged facing toward a center of the vehicle rather than all facing forwards, an arrangement also referred to as "campfire seating". It may be appreciated that such seating arrangements can also make possible the use of a display system that offers forward-facing and rearward-facing passengers viewing access.

Thus, while current display systems generally achieve their intended purpose, there is a need for a new display system that accommodates vehicles designed for passengers who are oriented in the rearward-facing or side-facing position in a vehicle as well as passengers in a forward-facing position. As will be discussed in greater detail below, in some embodiments, an end zone overhead display system can be readily installed in the roof structure of the vehicle. The display system can include mounts for displays that face both forward and rearward. In some embodiments, components of the display system are incorporated into an external trim panel, thereby appearing to extend downward in an aesthetically clean, smooth, and pleasing arrangement to passengers seated below. In addition, in some embodiments, the display system may be incorporated into the structural components of the roof and be designed to reduce or eliminate vibration of the display. Excess vibration or movement of the display can cause a user or viewer to suffer symptoms of motion sickness or dizziness particularly if the vibration or motion of the display appears to vary from the motion of the vehicle as a whole. In general, the current end zone display systems employ reinforced connections with the roof structure to reduce or eliminate excess vibration and movement, and ensure sturdy mounting of the displays.

The description of the overhead display system will refer generally to a vehicle having an interior compartment defined by a vehicle floor, opposing sidewalls, a forward end and a rearward end, and a vehicle ceiling covering the compartment. The forward end is where a driver or controller would traditionally sit and is the front of the vehicle in the forward direction of travel. The rearward end is the trailing portion of the vehicle when driving in the forward direction of travel. The seating configuration inside the interior compartment may be arranged in a variety of ways as described previously in vehicles that are autonomously driven. The vehicle may generally include at least one room strut extending or spanning across the vehicle ceiling from sidewall to sidewall to provide structural integrity to the vehicle. The forward and rearward ends may be finished on the inside with panels, dashboards and windshields to enclose the interior compartment For purposes of introduction, FIG. 1 presents an overhead schematic view of a vehicle roof showing placement of end zone overhead displays on the interior ceiling of the vehicle. An exemplary vehicle V is shown in dashed line and two overhead displays are shown schematically in the positions that they might be mounted on the ceiling of the vehicle. The front end zone display is labeled FD, and the rear end zone display is labeled RD. For purposes of context, a roof panel and mating ceiling structure may carry the overhead display mounting and support assembly.

Figure 2:
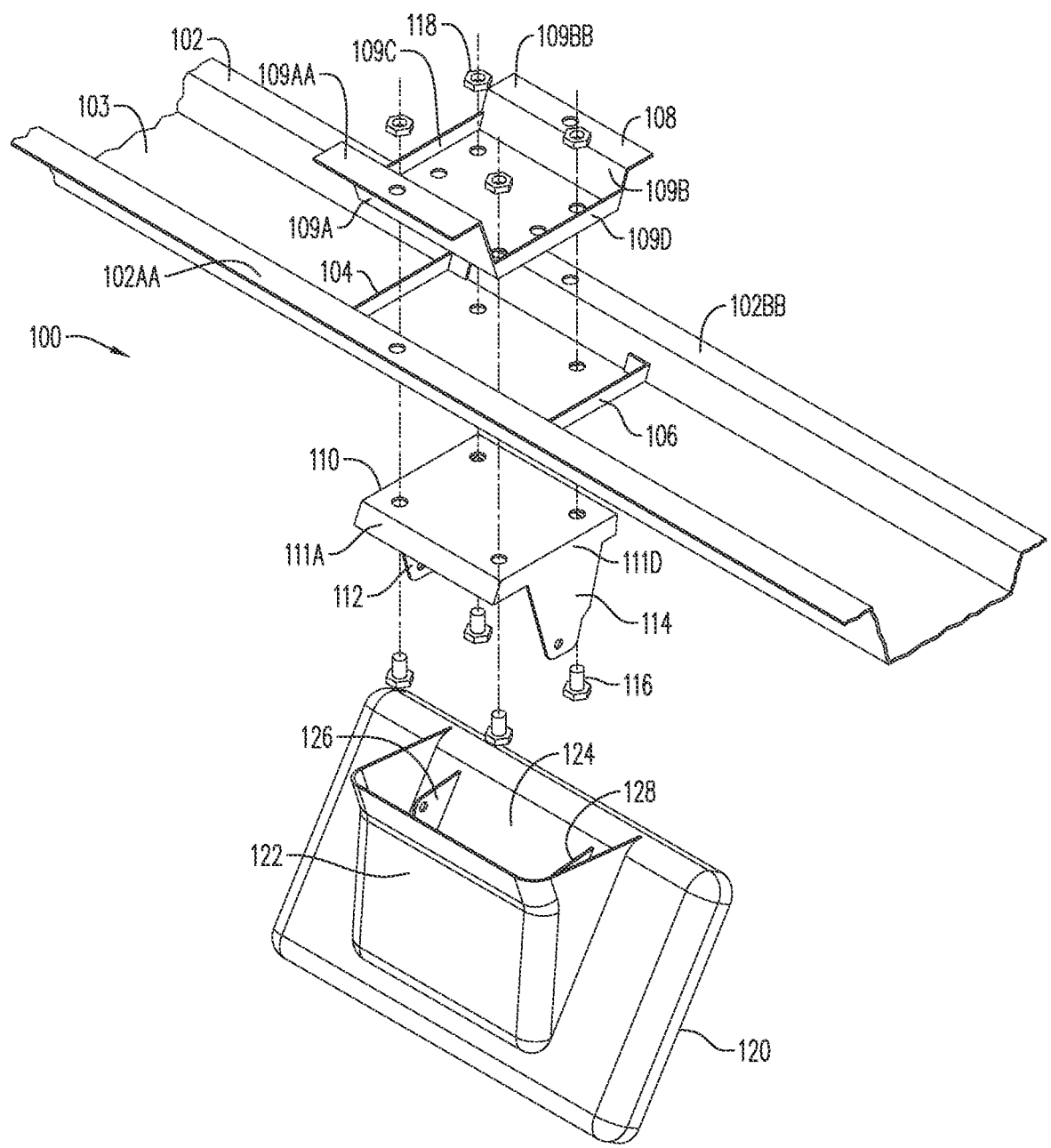
FIG. 2 is a schematic assembly view of a mounting structure of a front end zone display.
Figure 3:
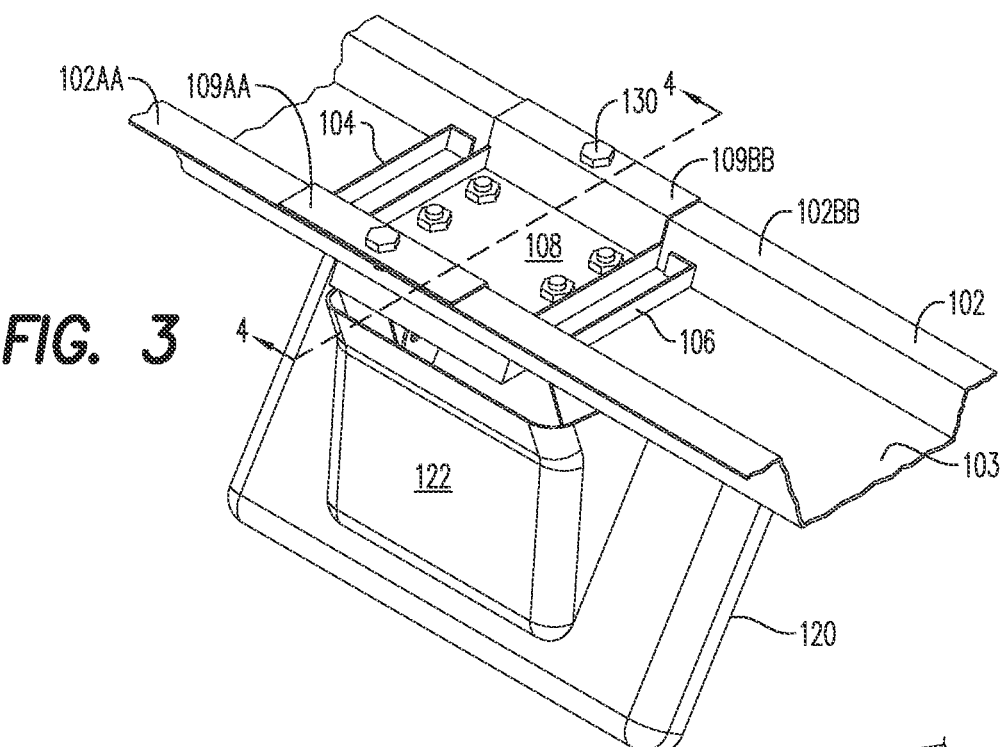
FIG. 3 is a schematic perspective view of the mounting structure of FIG. 2 shown assembled.

A series of views of the front end zone display assembly FD are illustrated in FIGS. 2-6 in isolation. Front end zone display assembly 100 is attached to roof bow or strut 102 which spans across the roof of the vehicle and part of the vehicle structure. A bulkhead area is created on roof strut 102 by attaching a combination of bulkhead panels, right bulkhead panel 104 and left bulkhead panel 106 at a location along roof strut 102 where the display is desired. Assembly 100 also includes an upper bulkhead center bracket 108 and a lower end zone display bracket 110. As can be seen in FIGS. 2-6, upper bracket 108 and lower bracket 110 sandwich between them roof strut 102 to provide a reinforced attachment of the display assembly to the roof structure of the vehicle. For simplicity of illustration, the drawings show the components schematically, and it will be understood that the actual components might have more details or geometries that are not necessarily captured schematically. In general, right and left bulkhead panels 104, 106 are configured to fit snugly into channel 103 of roof strut 102 and attach thereon as to provide a reinforced region of the strut onto which the mounting brackets are attached. As seen in the figures, upper bracket 108 is configured to also fit snugly into channel 103 in the area defined by bulkhead panels 104, 106. Upper bracket 108 may include a front wall 109A, a rear wall 109B, a right side wall 109C and a left side wall 109D. Front wall 109A may have a horizontal flange 109AA configured to overlay a frontward flange 102AA of strut 102, and rear wall 109B may have a horizontal flange 109BB configured to overlay a rearward flange 102BB of strut 102. In this manner, bracket flange matingly overlays strut flange 102AA, and bracket flange 109BB matingly overlays strut flange 102BB. Each of these flanges have apertures for connecting with bolts or fasteners 130 (not shown in FIG. 2, shown in FIG. 3).

Similarly, lower bracket 110 is configured with a horizontal upper surface that abuts against the lower portion of strut channel 103 when assembled. Lower bracket 110 has a downwardly extending front wall 111A and a downwardly extending rear wall 111B as well as a right wall 111C and left wall 111D. Integrated with right wall 111C is downwardly extending attachment flange 112, and similarly, integrated with left wall 111D is downwardly extending attachment flange 114. In this manner, lower bracket 110 presents a study open box-like structure with the opening of the box facing downward. By having the attachment flanges extend from the sidewalls of the lower bracket, any item mounted thereon will experience reduced side-to-side movement, but still have adjustment capability of the angle, such as a viewing angle.

Figure 4:
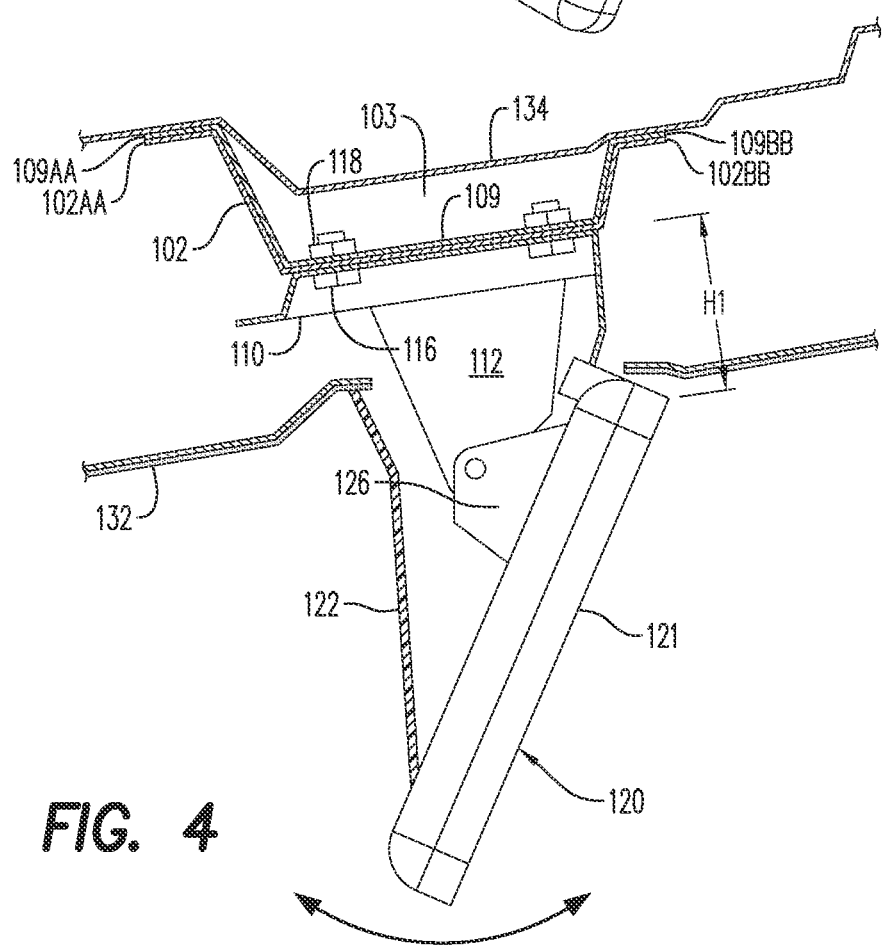
FIG. 4 is a cross section of the mounting structure taken along line 4-4 of FIG. 3.

The opposing attachment flanges 112 and 114 are configured to engage with mounting hardware in display housing 120. Specifically, display housing 120 is configured to include a display panel received therein. To provide an optimized viewing angle, display housing 120 is mounted to the attachment structure. Display housing 102 generally has the shape of a display screen housed therein. On the side of the display housing opposite the screen is provided a mounting element 122. In the illustrated embodiment, mounting element 122 is shown as a triangular prismatic element integrally formed or provided on the back side of display housing 120. Mounting element 122 includes a closed end and an open end with opening 124 facing toward the ceiling of the vehicle. Opening 124 provides access to integral mounting fins provided on display housing 120, right mounting fin 126 and left mounting fin 128 provided in element 124. As best seen in FIGS. 2 and 4, right mounting fin 126 attaches to right attachment flange 112 when display housing 120 is placed in mating relationship to the attachment assembly. As seen in FIG. 4, the geometry of the attachment flanges 112, 114 and the mounting fins 126 and 128 and their relationship to one another will determine the viewing angle of the display to a rider in the vehicle. As can be seen and apparent to one of ordinary skill, the shapes of these portions of the attachment assembly will allow for multiple degrees of design freedom when determining an optimized viewing angle.

The open box-like shapes of both the upper and lower brackets will provide a sturdy assembly that ensures reduction and elimination of rotation with respect to the strut 102. When assembled to strut 102, it can be seen in FIGS. 2-3 that upper bracket 108 is nestingly received in channel 103 in the bulkhead defined by bulkhead panels 104, and lower bracket 110 is attached underneath channel 103 so that strut 102 is sandwiched between the brackets. This assembly ensures a sturdy connection of the display brackets to the roof structure of the vehicle thereby reducing or eliminating unwanted excessive vibrations or movement of the display.

As best seen in FIG. 4, attachment flange 112 is fastened to mounting fin 126 to connect the display housing to the ceiling of the vehicle. Shown schematically in FIG. 4 is interior ceiling lining 132 which would provide a finished appearance inside the interior compartment of the vehicle. For completeness, a roof panel 134 is also shown schematically in FIG. 4 as overlaying the entire assembly. The roof panel may be covered by a vehicle roof. In addition, FIG. 4 shows schematically a height labeled H1 which is the distance between the top of display unit 121 and the ceiling lining or attachment system. This amount of distance may enable display unit 121 to vibrate or move excessively if the display unit were mounted without the features described herein. Within a moving vehicle, it has been found that the mounted display should satisfy a resonance frequency of 45 Hz or higher to provide a comfortable viewing experience. If the display were mounted with simple fasteners and without an attachment system that would prevent bowing or deflection of the roof strut, the display may be subject to excessive vibration and movement making viewing uncomfortable or even causing motion sickness sensations for a viewer. The combination of the open box shape of the upper bracket nested within the roof strut channel and the open box shape of the lower bracket attached to the underside of the channel provides a strong attachment structure that reduced unwanted vibration or movement and eliminates the possibly of the roof strut bowing or deforming.

Figure 5:
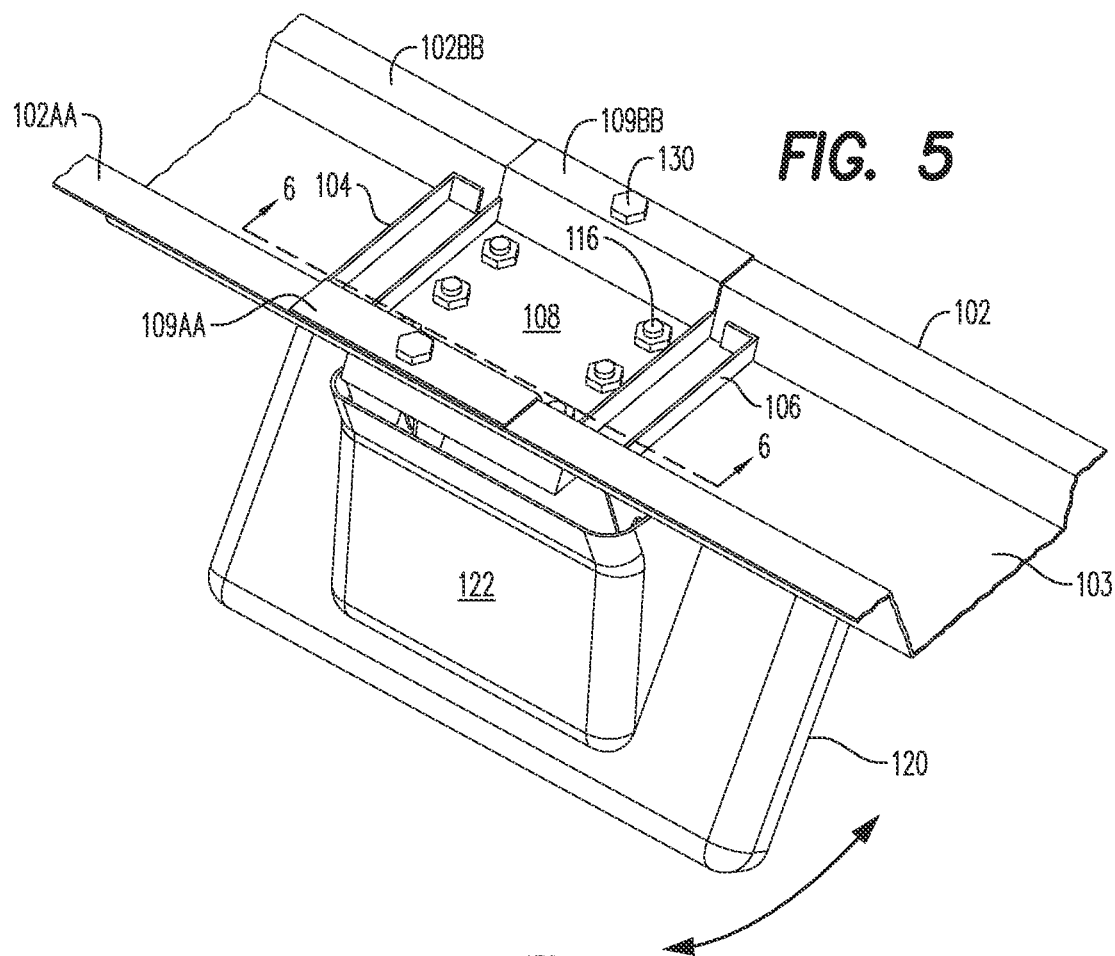
FIG. 5 is a schematic perspective view of the mounting structure similar to FIG. 2.
Figure 6:
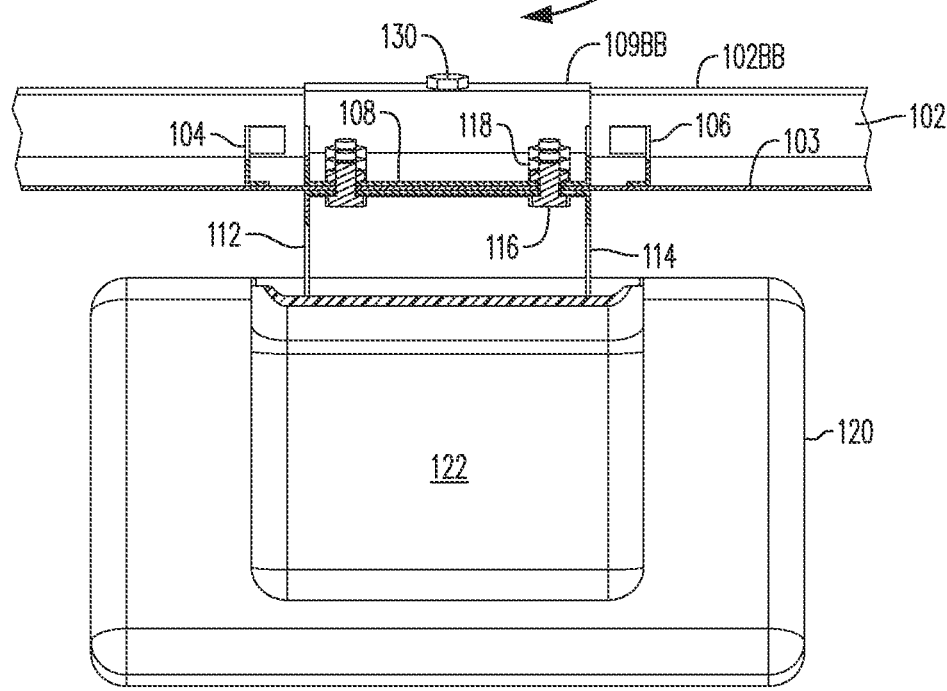
FIG. 6 is a cross section of the mounting structure taken along line 6-6 of FIG. 5.

The structural elements of the attachment system are attached to the roof panel in a customary fashion. It is possible that a mastic adhesive is interposed between the roof panel and the structural elements such as between horizontal flange 109BB and roof panel 134 in order to provide some measure of dampening of vibrations. The arrow in FIGS. 4 and 5 illustrate a range of possible movement of the display due to vibration. The attachment system of the present disclosure manages and controls this vibration to a reasonable amount so as to alleviate any discomfort to the viewers.

Figure 7:
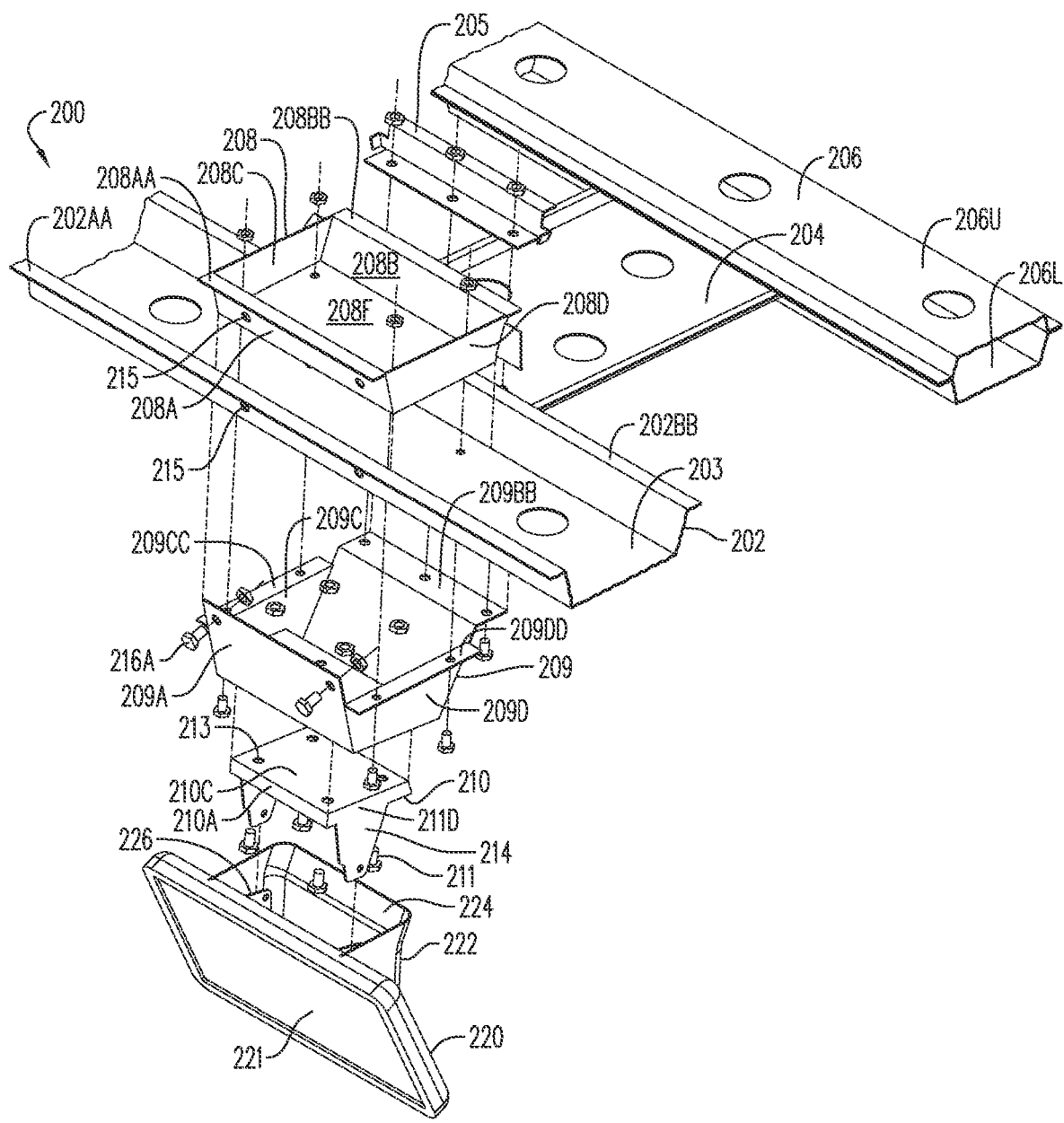
FIG. 7 is a schematic assembly view of a mounting structure of a rear end zone display.
Figure 8:
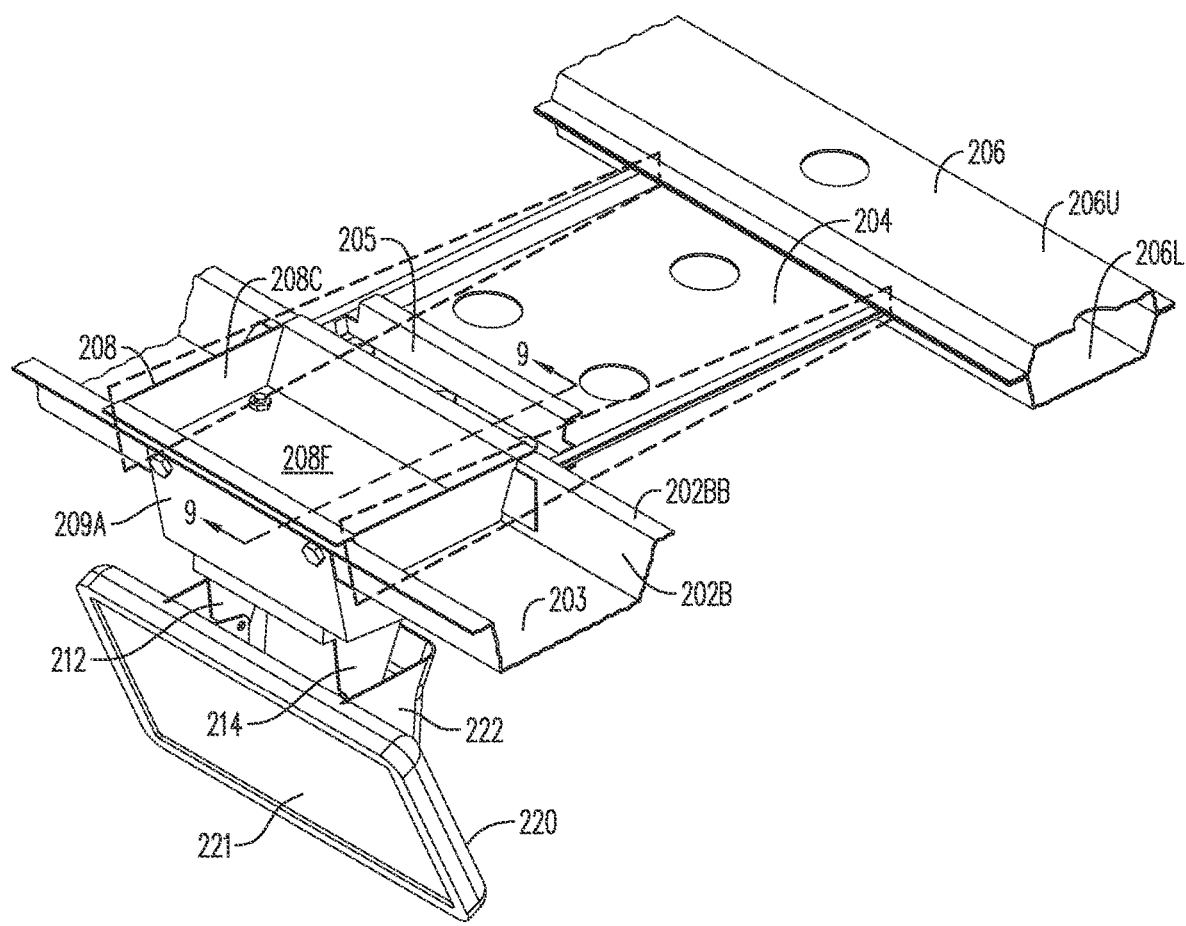
FIG. 8 is a schematic perspective view of the mounting structure of FIG. 7 shown assembled.

Turning now to the rear end zone assembly, a series of views of the rear end zone display assembly RD are illustrated in FIGS. 7-12 in isolation. FIG. 7 provides a perspective assembly view of a rear mounting system 200, and FIG. 8 provides a schematic perspective view of the mounting system of FIG. 7 shown assembled. The structural context for rear mounting system 200 includes a rear roof bow or strut 202 spanning across the vehicle from sidewall to sidewall to provide structural integrity to the roof and body of the vehicle. Rear roof strut 202 is similar in construction to front roof strut 102. For the rear end of the vehicle roof strut 202 may be connected by a center roof arch 204 disposed in perpendicular relation to roof strut 202, as well as rear roof rail 206 disposed in perpendicular relation to roof arch 204, and therefore parallel to roof strut 202. As seen in the figures, roof rail 206 may be a tubular or box beam configuration for improved strength or rigidity and to provide space for other components or wiring therein or thereon.

In general, right and left bulkhead panels 104, 106 are configured to fit snugly into channel 103 of roof strut 102 and attach thereon as to provide a reinforced region of the strut onto which the mounting brackets are attached. As seen in the figures, upper bracket 108 is configured to also fit snugly into channel 103 in the area defined by bulkhead panels 104, 106. Upper bracket 108 may include a front wall 109A, a rear wall 109B, a right side wall 109C and a left side wall 109D. Front wall 109A may have a horizontal flange 109AA configured to overlay a frontward flange 102AA of strut 102, and rear wall 109B may have a horizontal flange 109BB configured to overlay a rearward flange 102BB of strut 102. In this manner, bracket flange matingly overlays strut flange 102AA, and bracket flange 109BB matingly overlays strut flange 102BB. Each of these flanges have apertures for connecting with bolts or fasteners 130 (not shown in FIG. 2, shown in FIG. 3).

Similarly, lower bracket 110 is configured with a horizontal upper surface that abuts against the lower portion of strut channel 103 when assembled. Lower bracket 110 has a downwardly extending front wall 111A and a downwardly extending rear wall 111B as well as a right wall 111C and left wall 111D. Integrated with right wall 111C is downwardly extending attachment flange 112, and similarly, integrated with left wall 111D is downwardly extending attachment flange 114. In this manner, lower bracket 110 presents a study open box-like structure with the opening of the box facing downward. By having the attachment flanges extend from the sidewalls of the lower bracket, any item mounted thereon will experience reduced side-to-side movement, but still have adjustment capability of the angle, such as a viewing angle.

The opposing attachment flanges 112 and 114 are configured to engage with mounting hardware in display housing 120. Specifically, display housing 120 is configured to include a display panel received therein. To provide an optimized viewing angle, display housing 120 is mounted to the attachment structure. Display housing 102 generally has the shape of a display screen housed therein. On the side of the display housing opposite the screen is provided a mounting element 122. In the illustrated embodiment, mounting element 122 is shown as a triangular prismatic element integrally formed or provided on the back side of display housing 120. Mounting element 122 includes a closed end and an open end with opening 124 facing toward the ceiling of the vehicle. Opening 124 provides access to integral mounting fins provided on display housing 120, right mounting fin 126 and left mounting fin 128 provided in element 124. As best seen in FIGS. 2 and 4, right mounting fin 126 attaches to right attachment flange 112 when display housing 120 is placed in mating relationship to the attachment assembly. As seen in FIG. 4, the geometry of the attachment flanges 112, 114 and the mounting fins 126 and 128 and their relationship to one another will determine the viewing angle of the display to a rider in the vehicle. As can be seen and apparent to one of ordinary skill, the shapes of these portions of the attachment assembly will allow for multiple degrees of design freedom when determining an optimized viewing angle.

The open box-like shapes of both the upper and lower brackets will provide a sturdy assembly that ensures reduction and elimination of rotation with respect to the strut 102. When assembled to strut 102, it can be seen in FIGS. 2-3 that upper bracket 108 is nestingly received in channel 103 in the bulkhead defined by bulkhead panels 104, and lower bracket 110 is attached underneath channel 103 so that strut 102 is sandwiched between the brackets. This assembly ensures a sturdy connection of the display brackets to the roof structure of the vehicle thereby reducing or eliminating unwanted excessive vibrations or movement of the display.

As best seen in FIG. 4, attachment flange 112 is fastened to mounting fin 126 to connect the display housing to the ceiling of the vehicle. Shown schematically in FIG. 4 is interior ceiling lining 132 which would provide a finished appearance inside the interior compartment of the vehicle. For completeness, a roof panel 134 is also shown schematically in FIG. 4 as overlaying the entire assembly. The roof panel may be covered by a vehicle roof. In addition, FIG. 4 shows schematically a height labeled H1 which is the distance between the top of display unit 121 and the ceiling lining or attachment system. This amount of distance may enable display unit 121 to vibrate or move excessively if the display unit were mounted without the features described herein. Within a moving vehicle, it has been found that the mounted display should satisfy a resonance frequency of 45 Hz or higher to provide a comfortable viewing experience. If the display were mounted with simple fasteners and without an attachment system that would prevent bowing or deflection of the roof strut, the display may be subject to excessive vibration and movement making viewing uncomfortable or even causing motion sickness sensations for a viewer. The combination of the open box shape of the upper bracket nested within the roof strut channel and the open box shape of the lower bracket attached to the underside of the channel provides a strong attachment structure that reduced unwanted vibration or movement and eliminates the possibly of the roof strut bowing or deforming.

The structural elements of the attachment system are attached to the roof panel in a customary fashion. It is possible that a mastic adhesive is interposed between the roof panel and the structural elements such as between horizontal flange 109BB and roof panel 134 in order to provide some measure of dampening of vibrations. The arrow in FIGS. 4 and 5 illustrate a range of possible movement of the display due to vibration. The attachment system of the present disclosure manages and controls this vibration to a reasonable amount so as to alleviate any discomfort to the viewers.

As described previously, the rear end zone display is labeled RD in FIG. 1. The front end zone display is labeled FD, and the rear end zone display is labeled RD. As can be surmised from the figures, the display in the rear end zone display maybe positioned such that a passenger seated in a rear-facing position will be able to review the rear end zone display at a comfortable position and angle. The principles of the structure may of course be applied such that the rear end zone display is positioned just in front of a forward-facing rear seat as in a traditional seating arrangement. It will be understood that the position of the assembly along the front to rear direction of the vehicle roof is one of design choice and the adjustment necessary will be apparent to one of ordinary skill in the art.

A series of views of the rear end zone display assembly RD are illustrated in FIGS. 7-12 in isolation. Rear end zone display assembly 200 is attached to rear roof bow or strut 202 which spans across the roof of the vehicle from sidewall to sidewall in the rear area of the compartment and is a part of the vehicle structure. The rear end zone display assembly has more structural components associated with it in the vehicle roof including a center roof arch 204 in perpendicular relation to strut 202, and a rear roof rail 206 that is in perpendicular relation to the roof arch 204, and therefore in largely parallel relation to rear roof strut 202. Rear roof rail 206 has a hollow cross section formed by the mating of an upper roof rail element 206U and a lower roof rail element 206L. The geometry of the rear roof rail provides it with the necessary strength and rigidity spanning across the rear roof and windshield junction.

A bulkhead area is created on roof strut 202 at a location along roof strut 202 where the display is desired. Assembly 200 also includes an upper bulkhead center bracket 208 and a lower end zone display bracket 210. As can be seen in FIGS. 7-12, upper bracket 208 and lower bracket 210 sandwich between them roof strut 202 to provide a reinforced attachment of the display assembly to the roof structure of the vehicle. For simplicity of illustration, the drawings show the components schematically, and it will be understood that the actual components might have more details or geometries that are not necessarily captured schematically.

Figure 9:
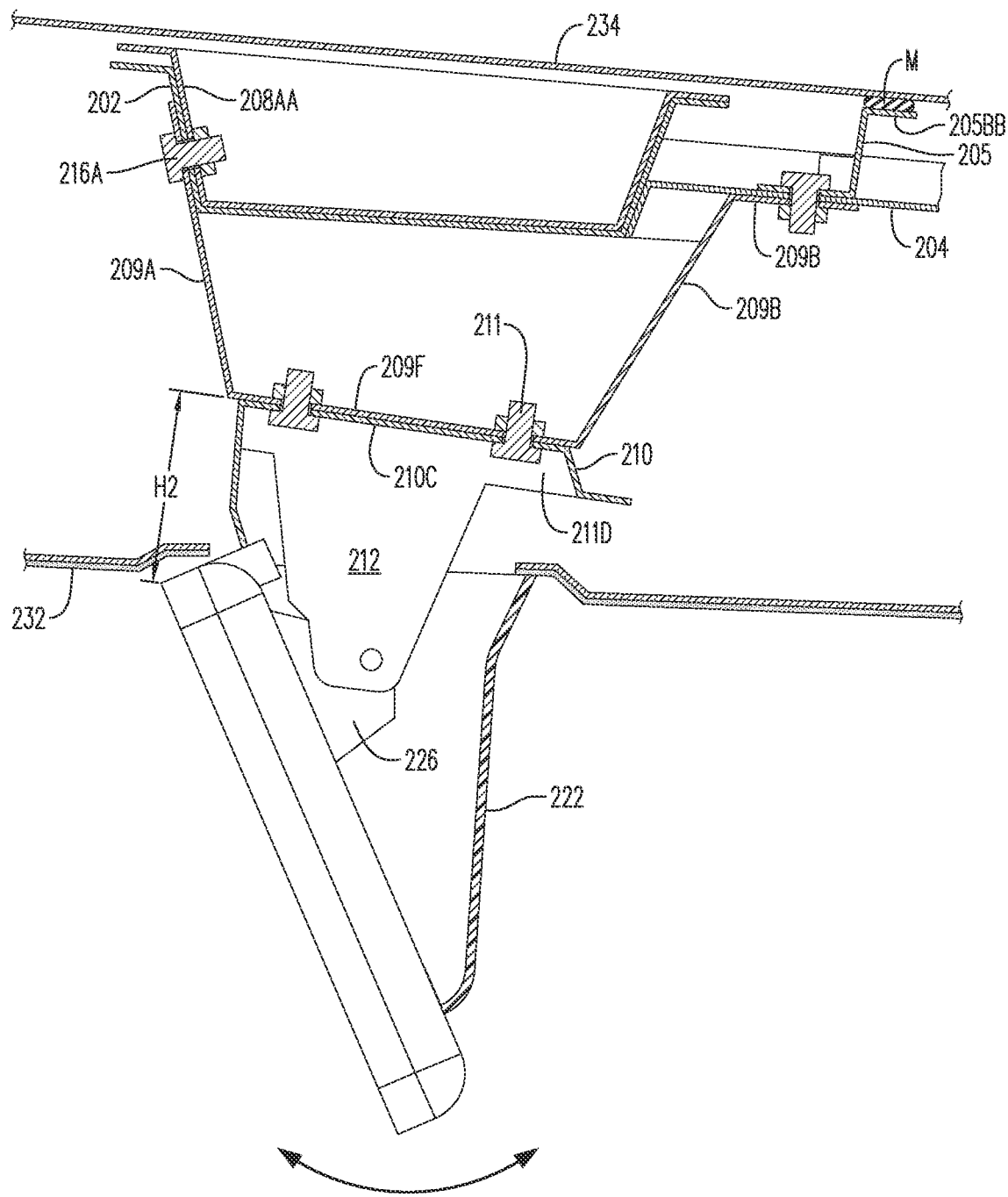
FIG. 9 is a cross section of the mounting structure taken long line 9-9 of FIG. 8.
Figure 10:
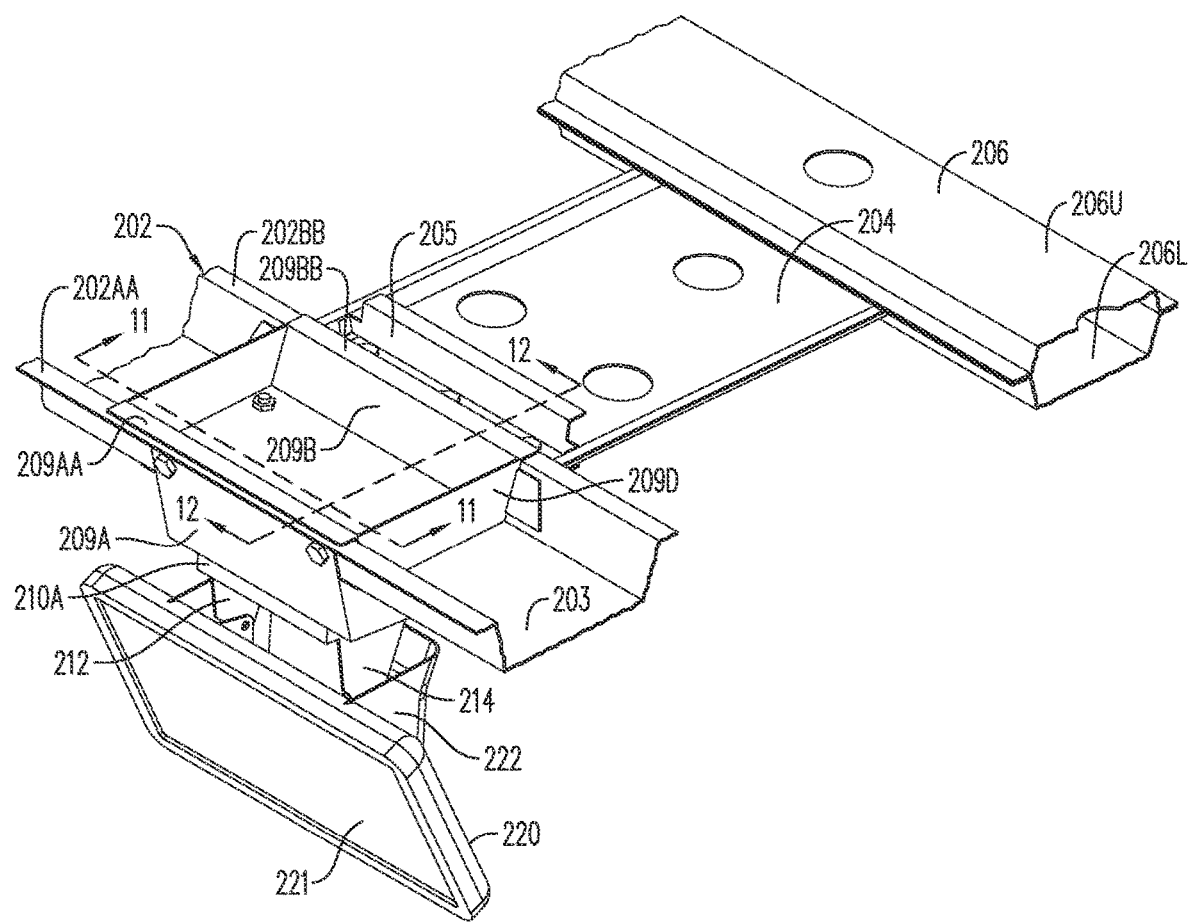
FIG. 10 is a schematic perspective view of the mounting structure similar to FIG. 8.
Figure 11:
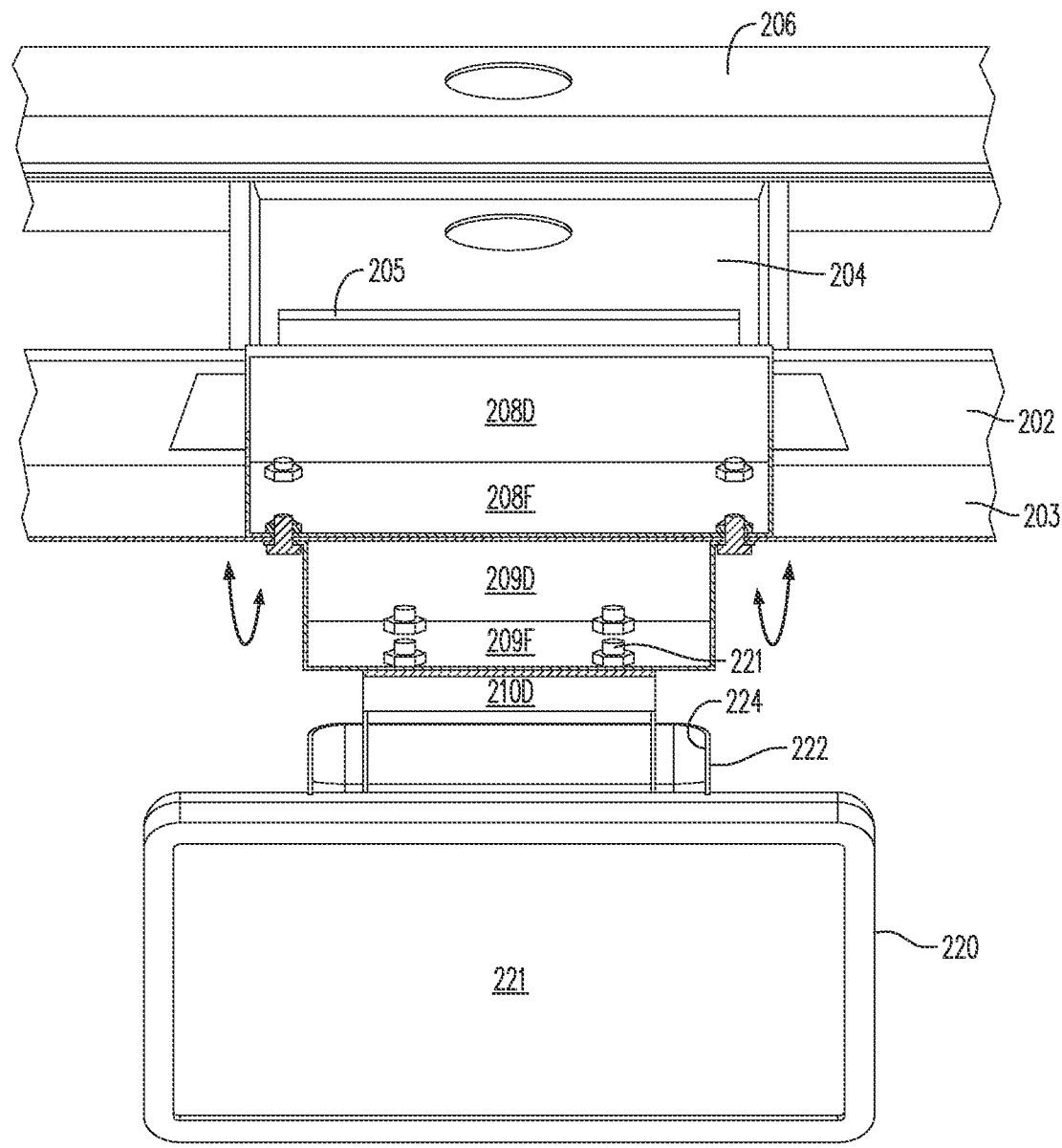
FIG. 11 is a cross section of the mounting structure taken long line 11-11 of FIG. 10.

In this way a bulkhead area is created on rear roof strut 202 by cooperation of a combination of elements received in and attached to channel 203 of rear roof strut 202 including a rear bulkhead element 205, along with an upper bracket 208 and lower bracket assembly at a location along roof strut 202 where the display is desired. Assembly 200 includes an upper bulkhead center bracket 208 and a lower end zone display bracket 210 and a lower bracket extension 209. It will be noted that these elements are shown schematically in the figures and they may be configured with more enhanced geometries and contours to facilitate their engagement with one another. As can be seen in FIGS. 7-12, upper bracket 208 has an open box-like configuration with a a front wall 208A, a rear wall 208B, a side walls 208C and an opposing sidewall 208D integral with a bracket floor 208F. In this way, upper bracket 208 has an open box-like configuration and is sized and configured to be received in and fit into channel 203. When seated in channel 203, bracket floor 208F abuts against the channel floor, and front wall 208A abuts against the front wall of the channel while rear wall 208B abuts against the rear wall of the channel. As best seen in FIGS. 7-9, upper bracket front wall 208A and abutting channel front wall have attachment apertures 215 which receive fasteners 216A when assembled together. In addition, lower bracket extension 209 also has an open box-like configuration and has a front wall 209A, a rear wall 209B, a side wall 209C and an opposing side wall 209D. Lower bracket extension 209 has a floor 209F as well. When assembled together, lower bracket front wall 209A overlays channel front wall which abuts against upper bracket 208A. Lower bracket extension front wall 209A also has apertures 215 therein such that when the upper bracket and lower bracket extension are assembled onto the channel of rear roof strut 202, fastener 216A will be inserted into aperture 215 as aligned when assembled to sturdily hold the upper bracket and lower bracket extension to roof strut 202.

Another component of the rear end zone assembly is lower bracket 210 which abuts against lower bracket extension floor 209F when assembled. Lower bracket 210 has an upper surface 210C that abuts against lower bracket extension floor 209F, and is attached thereto with suitable fasteners 211 received in aligned apertures 213. While lower bracket extension floor 209F and lower bracket upper surface 210C are shown as planar, it will be understood that these mating surfaces may be configured with other geometries and contours including those that enable quick alignment and interference fit with one another. The combination of the lower bracket extension and the lower bracket provide a sturdy, bulkheaded configuration to the assembly as best seen in the section view, FIG. 9.

It can be seen in FIG. 9 that the reception and attachment of upper bracket 208 into the channel of roof strut 202 combined with the lower bracket extension overlaying the front and rear walls of the channel and attached thereto provide a reinforced, sturdy assembly that will resist unwanted rotation, motion and vibration of the display assembly with respect to the vehicle roof or ceiling. For simplicity of illustration, the drawings show the components schematically, and it will be understood that the actual components might have more details, geometries or contours that are not necessarily captured schematically. As seen in the figures, upper bracket 208 is configured to also fit snugly into channel 203 in the desired area. As can be seen in the figures rear bulkhead element 205 also lends rigidity to the assembly by supporting the assembly from its attachment into center roof arch 204. To reinforce the assembly even more, rear bulkhead element 205 may also be attached to lower bracket extension 209 at its rear wall 209B at a horizontally presented ledge 209BB.

On the rear upper bracket, front wall 208A may have a horizontal flange 208AA configured to overlay a frontward flange 202AA of strut 202, and rear wall 208B may have a horizontal flange 208BB configured to overlay a rearward flange 202BB of strut 202. In this manner, the upper bracket flange matingly overlays strut flange 202AA, and upper bracket flange 208BB matingly overlays strut flange 202BB. Each of these flanges have apertures for connecting with bolts or fasteners.

Similarly lower bracket extension 209 may have side walls 209C and 209D which each have horizontal flanges 209CC and 209DD respectively. In addition, rear wall 209B may have a horizontal flange 209BB which is configured to abut strut flange 202BB. The flanges and their attachment to each other when applicable lend another degree of rigidity to the structure.

In addition, lower bracket 210 is configured with a horizontal upper surface 210C that abuts against the floor 209F of lower bracket extension 209 when assembled. Lower bracket 210 has a downwardly extending front wall 210A and a downwardly extending rear wall 210B as well as a side wall 211C and opposing side wall 211D. Integrated with wall 211C is downwardly extending attachment flange 212, and similarly, integrated with left wall 211D is downwardly extending attachment flange 214. In this manner, lower bracket 210 presents a sturdy open box-like structure with the opening of the box facing downward. By having the attachment flanges extend from the sidewalls of the lower bracket, any item mounted thereon will experience reduced side-to-side movement, but still have adjustment capability of the angle, such as a viewing angle.

Figure 12:
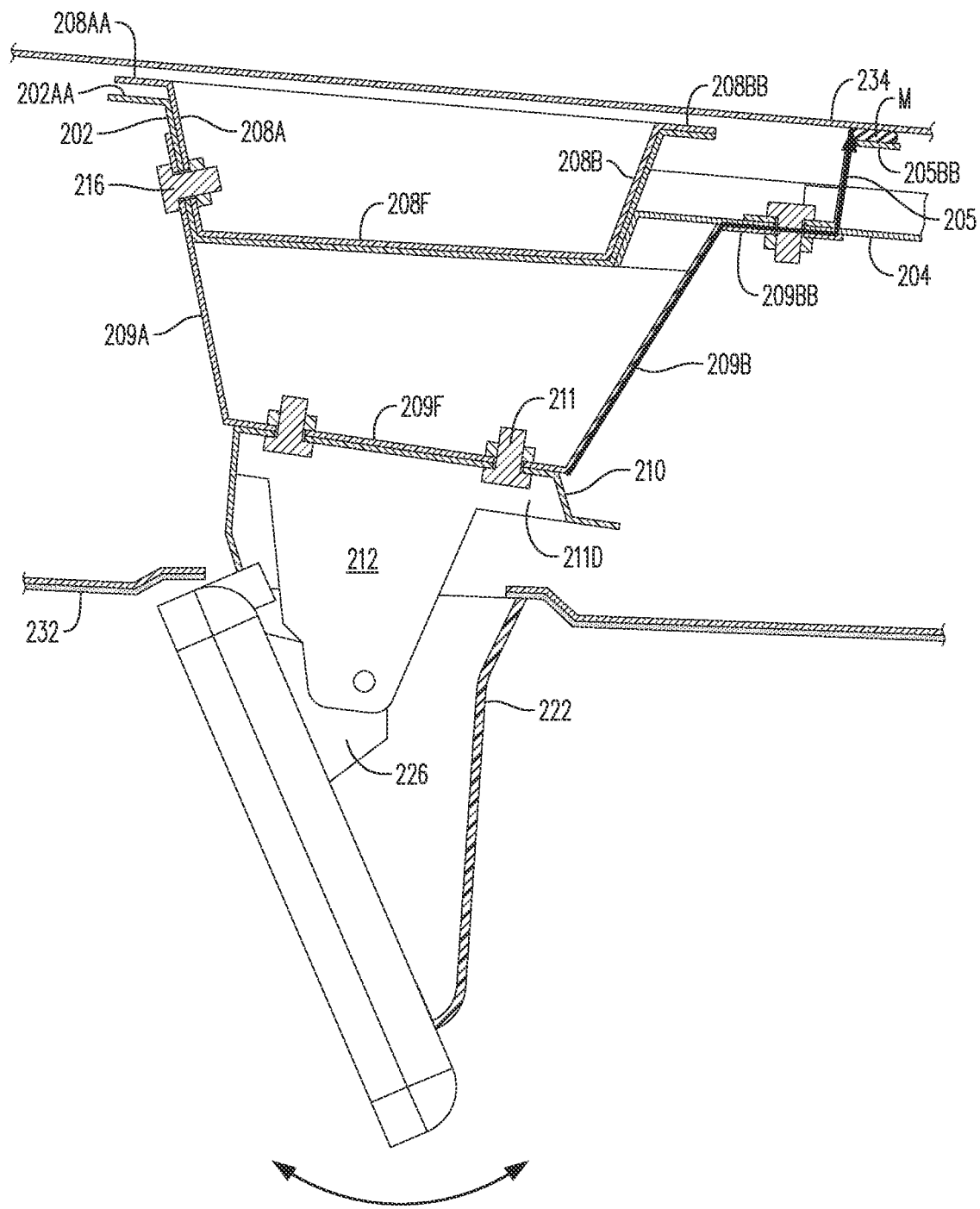
FIG. 12 is a cross section of the mounting structure taken along line 12-12 of FIG. 10.

The opposing attachment flanges 212 and 214 are configured to engage with mounting hardware in display housing 220. Specifically, display housing 220 is configured to include a display panel received therein. To provide an optimized viewing angle, display housing 220 is mounted to the attachment structure. Display housing 220 generally has the shape of a display screen housed therein. On the side of the display housing opposite the screen is provided a mounting element 222. In the illustrated embodiment, mounting element 222 is shown as a triangular prismatic element integrally formed or provided on the back side of display housing 220. Mounting element 222 includes a closed end and an open end with opening 224 facing toward the ceiling of the vehicle. Opening 224 provides access to integral mounting fins provided on display housing 220, right mounting fin 226 and left mounting fin 228 are provided in element 224. As best seen in FIGS. 9 and 12, right mounting fin 226 attaches to right attachment flange 212 when display housing 220 is placed in mating relationship to the attachment assembly. As seen in FIG. 9, the geometry of the attachment flanges 212, 214 and the mounting fins 226 and 228 and their relationship to one another will determine the viewing angle of the display to a rider in the vehicle. As can be seen and apparent to one of ordinary skill, the shapes of these portions of the attachment assembly will allow for multiple degrees of design freedom when determining an optimized viewing angle.

The open box-like shapes of both the upper and lower bracket extension as well as the lower bracket will provide a sturdy assembly that ensures reduction and elimination of rotation with respect to the strut 202. When assembled to strut 202, it can be seen that upper bracket 208 is nestingly received in channel 203 in the bulkhead defined by the assembly, and lower bracket extension 209 and lower bracket 210 are attached underneath channel 203 so that strut 202 is sandwiched between the upper bracket and the lower bracket extension. This assembly ensures a sturdy connection of the display brackets to the roof structure of the vehicle thereby reducing or eliminating unwanted excessive vibrations or movement of the display.

As best seen in FIGS. 9 and 12, attachment flange 212 is fastened to mounting fin 226 to connect the display housing to the ceiling of the vehicle. Shown schematically in FIGS. 9 and 12 are interior ceiling lining 232 which would provide a finished appearance inside the interior compartment of the vehicle. For completeness, a roof panel 234 is also shown schematically in FIG. 9 as overlaying the entire assembly. The roof panel may be covered by a vehicle roof. In addition, FIG. 9 shows schematically a height labeled H2 which is the distance between the top of display unit 221 and the ceiling lining and the attachment of lower bracket extension 209 to lower bracket 210. This amount of distance may enable display unit 221 to vibrate or move excessively if the display unit were mounted without the features described herein. Within a moving vehicle, it has been found that the mounted display should satisfy a resonance frequency of 45 Hz or higher to provide a comfortable viewing experience. If the display were mounted with simple fasteners and without an attachment system with the bulkhead configuration described that prevents bowing or deflection of the roof strut, the display may be subject to excessive vibration and movement making viewing uncomfortable or even causing motion sickness sensations for a viewer. The combination of the open box shape of the upper bracket nested within the roof strut channel and the open box shape of the lower bracket extension attached to the underside of the channel provides a strong attachment structure that reduces unwanted twisting, vibration or movement and eliminates the possibly of the roof strut bowing or deforming.

The structural elements of the attachment system are attached to the roof panel in a customary fashion. It is possible that a mastic adhesive M is interposed between the roof panel and the structural elements such as between horizontal flange 205BB and roof panel 234 in order to provide some measure of dampening of vibrations. The arrow in FIGS. 9 and 12 illustrate a range of possible movement of the display due to vibration. The attachment system of the present disclosure manages and controls this vibration to a reasonable amount so as to alleviate any discomfort to the viewers.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. An overhead display system for a vehicle having an interior compartment defined by a vehicle floor, opposing sidewalls, a forward end and a rearward end, and a vehicle ceiling covering at least part of the interior compartment, the overhead display system comprising:
   a roof strut having an upwardly facing channel extending across the vehicle ceiling from sidewall to sidewall, said channel defined by a front wall and a rear wall and presenting a bulkhead;
   a display mounting assembly connected to said roof strut at a desired location for a display, said mounting assembly comprising
   an upper bracket having a front wall and a rear wall configured such that said upper bracket fits into said channel with said bracket front wall abutting against said channel front wall, and said bracket rear wall abutting against said channel rear wall;
   a lower bracket having a pair of side walls each with an integral downward extending attachment flange, said lower bracket is attached to the underside of said roof strut channel in alignment with said upper bracket,
   at least one fastener to attach said upper bracket and said lower bracket together such that said roof strut is sandwiched therebetween; and
   a display unit disposed in a display housing, said display housing attached to at least one of said attachment flanges to mount said display unit in a desired overhead position and viewing angle within the interior compartment.

2. The system of claim 1, further comprising a pair of bulkhead panels received in said channel and disposed parallel to one another and defining an attachment area for said upper bracket therebetween.

3. The system of claim 1, wherein said upper bracket has an open box configuration and includes upper bracket sidewalls.

4. The system of claim 1, wherein said channel includes horizontal ledges integral with each of said channel front wall and said channel rear wall, and wherein said upper bracket includes a front wall flange that overlays said channel front wall ledge and a rear wall flange that overlays said channel rear wall ledge.

5. The system of claim 4, further comprising a fastener for fastening said channel front wall ledge to said upper bracket front wall flange.

6. The system of claim 4, further comprising a fastener for fastening said channel rear wall ledge to said upper bracket rear wall flange.

7. The system of claim 1, wherein said lower bracket has an open box configuration including a lower bracket front wall and a lower bracket rear wall forming, together with said lower bracket sidewalls, an open end facing downward.

8. The system of claim 7, wherein each of said lower bracket sidewalls includes an integral downwardly extending flange onto which said display housing may be attached.

9. The system of claim 8, wherein said display housing includes a pair of mounting fins spaced to couple with and attached to said downwardly extending flanges of said lower bracket.

10. The system of claim 9, wherein said mounting fins are attached to said flanges by a threaded fastener and nut, wherein said flanges extend from the sidewalls of said lower bracket to sturdily attach the display housing to reduce side to side movement of the display yet enable adjustment of the display viewing angle.

11. An end zone overhead display system for a vehicle having an interior compartment defined by a vehicle floor, opposing sidewalls, a forward end and a rearward end, and vehicle ceiling covering at least a part of the interior compartment including a roof strut extending across the vehicle ceiling from sidewall to sidewall, the assembly comprising:
   a display mounting system adapted to be attached the roof strut of the vehicle ceiling, said mounting system comprising
   an upper bracket having a front wall and a rear wall adapted to be attached to an upper side of the roof strut,
   a lower bracket having side walls with integral downward extending attachment flanges, wherein said upper bracket and said lower bracket are attached to one another and the roof strut,
   at least one fastener to attach said upper bracket and said upper bracket together such that the roof strut is interposed therebetween; and
   a display unit disposed in a display housing, said display housing attached to at least one of said attachment flanges to mount said display unit in a desired position and viewing angle within the interior compartment.

12. The system of claim 11, further comprising a lower bracket extension disposed underneath said roof strut and above said lower bracket to provide a sturdy assembly structure to said system.

13. The system of claim 12, further comprising a central roof arch in perpendicular relationship to said roof strut, said arch carrying a bulkhead element to abut against said upper bracket and said roof strut.

14. The system of claim 13, wherein said bulkhead element has a horizontal flange onto which a mastic adhesive is applied at a juncture with a roof panel.

15. An end zone overhead display system for a vehicle having an interior compartment defined by a vehicle floor, opposing sidewalls, a forward end and a rearward end, and a vehicle ceiling covering at least part of the interior compartment, the end zone overhead display system comprising:

a front display assembly including a front upper bracket and a front lower bracket attached to a front roof strut interposed therebetween, said front lower bracket including an attachment flange attached to an attachment fin of a front display housing; and a rear display assembly including a rear upper bracket, a rear lower bracket extension attached to a rear roof strut interposed therebetween, said rear display assembly also including a rear lower bracket attached to said rear lower bracket extension and including an attachment flange attached to an attachment fin of a rear display housing.

16. The system of claim 15, wherein said front upper bracket has an open box-like configuration and is received in a channel in said front roof strut.

17. The system of claim 15, wherein said rear upper bracket has an open box-like configuration and is received in a channel in said rear roof strut.

18. The system of claim 15, wherein said front lower bracket has an open box-like configuration and includes said attachment flange as an integral portion of a front lower bracket sidewall.

19. The system of claim 15, wherein said rear lower bracket has an open-box-like configuration and includes said attachment flange as an integral portion of a rear lower bracket sidewall.

20. The system of claim 19, further comprising a rear bulkhead element abutting against said channel of said rear roof strut and attached to said rear lower bracket extension.

* * * * *